INVENTOR
LOUIS R. CONRATH
BY Adam Richmond
ATTORNEY.

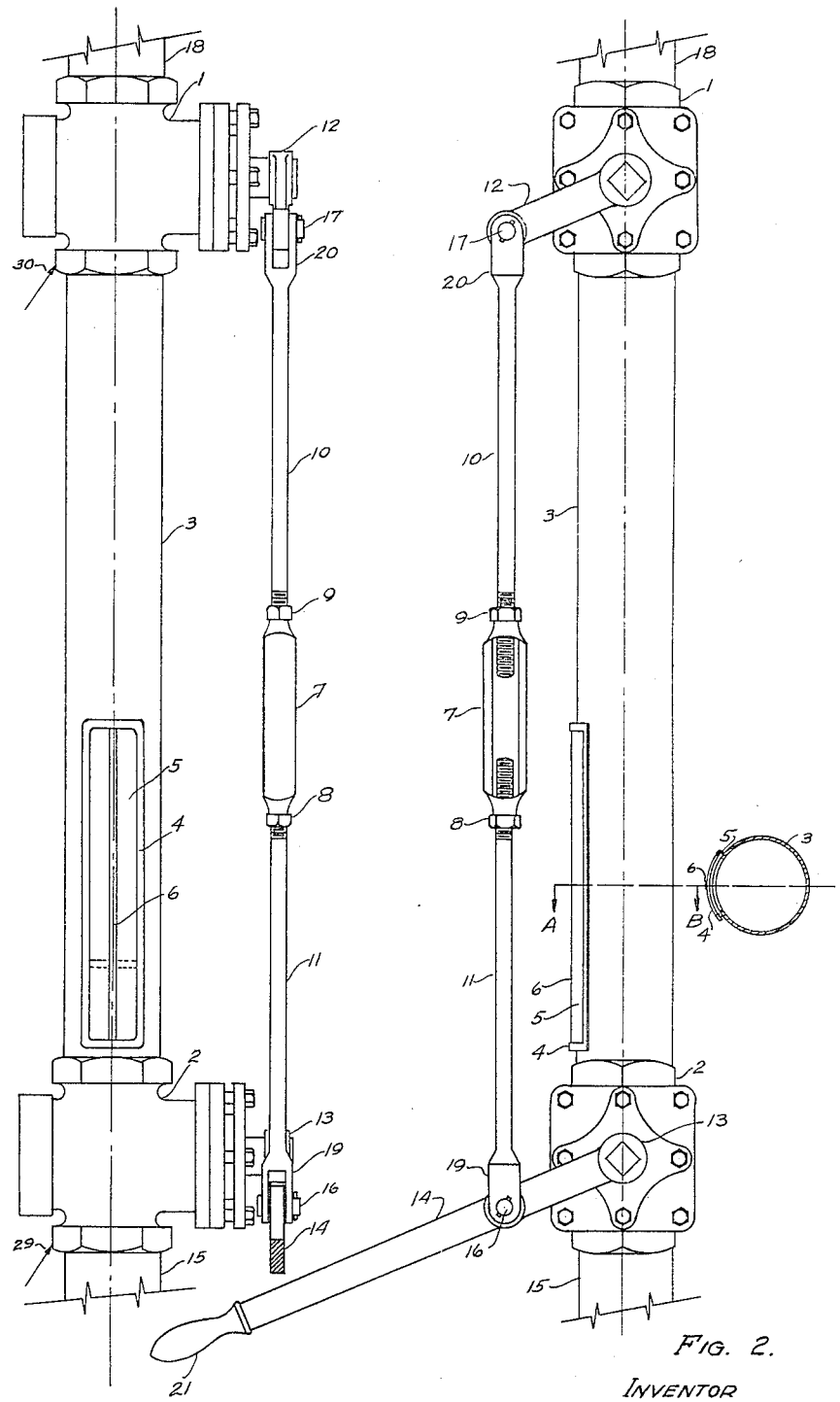

Patented June 29, 1937

2,085,007

UNITED STATES PATENT OFFICE 2,085,007

DEVICE FOR DETERMINING THE PERCENT OF SOLIDS PRESENT IN THE DISCHARGE MATERIAL OF PIPE LINE DREDGES

Louis R. Conrath, Fort Wayne, Ind.

Application August 14, 1936, Serial No. 96,073

3 Claims. (Cl. 73—51)

(Granted under the act of March 3, 1883, as amended April 30, 1928; 370 O. G. 757)

This invention described herein, may be manufactured and used by or for the Government for governmental purposes, without the payment to me of any royalty thereon.

This invention relates in general to a device to be used as a gauge for determining the percentage of solids present in a mixture flowing through a pipe or other closed channel, said mixture being composed of one or more kinds of solid material, temporarily suspended by virtue of agitation in a liquid or mixture of liquid substances. An example of such a mixture would be a temporary suspension of sand and mud particles in water.

More specifically, it relates to a device having a settling chamber equipped with valves, or other suitable means, by which a sample of the mixture may be admitted and wherein the solids may separate from the liquids, a transparency or other device to permit determination of the relative levels of the precipitated solids, and a calibrated gauge, or its equivalent, to indicate directly in percentage or other terms, the amount of the precipitated solids, with reference to the liquid vehicle.

According to one important embodiment of this invention, a gauge for determining the percentage of solids in the discharge of pipe line dredges, consists of a relatively long tube or container of circular, or other, cross-section, suitably mounted in a vertical position, and equipped with a valve at each end, connected by a mechanical linkage to each other, and having the upper valve coupled to the discharge pipe of the dredge and the lower valve to a disposal means, such as an overboard discharge pipe. When both valves are open, the mixture of liquids and solids enters the settling chamber through the upper valve, flows through said chamber, and the lower valve and is discharged overboard through a pipe provided for that purpose. When the two valves are simultaneously closed by means of the operating mechanism described below, a sample of the mixture is intercepted in the settling chamber. Upon standing, the suspended solids settle to the bottom of the tube, after which the levels of the solids contained therein may be observed through a transparent window and compared with a gauge, attached to the settling chamber, which is calibrated in percent, and which indicates directly and without computation, the volumetric percentage of the mixture which is composed of solids. Since sand and mud particles will precipitate in two separate layers, the gauge will indicate not only the total percentage of solids, but also the percentage of each individual component.

Figure 3:
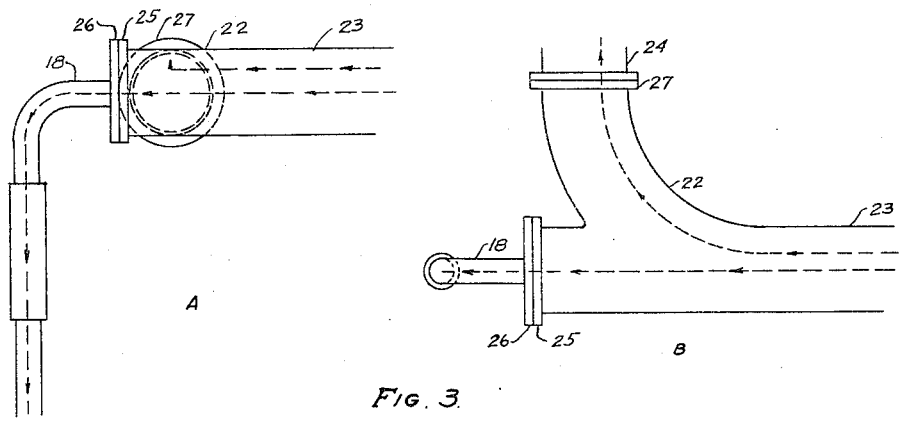
Figure 4:
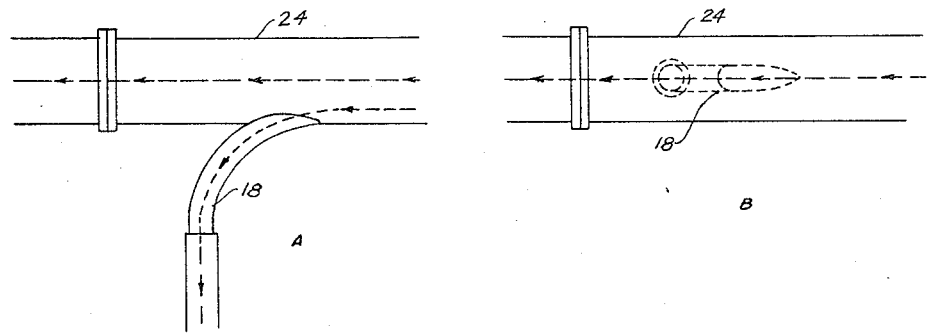
Figure 5:
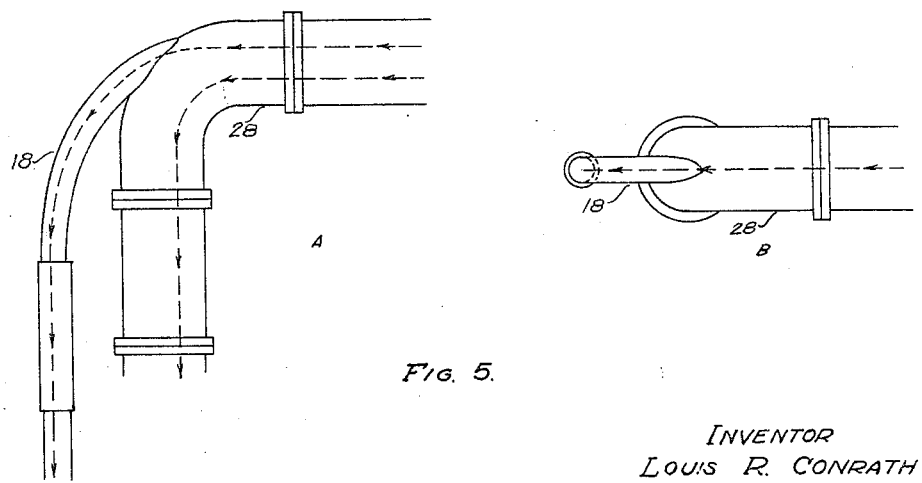

In the attached drawings, Figures 1 and 2 represent front and side elevations, respectively, of a suggested construction of this gauge, and Figures 3, 4, and 5, indicate in portions A and B respectively, elevation and plan views of three representative means of attaching the gauge to the discharge pipe of the dredge.

Referring to Figures 1 and 2, 3 is a tube or pipe, having a threaded portion at each end, to which are attached two plug type valves 1 and 2, in which the opening and closing of the valve is accomplished by rotating a tapered plug having a hole through it in a direction perpendicular to the axis of the plug. To the upper end of the valve 1 is attached a pipe 18 which is connected to the discharge pipe of the dredge as shown in Figures 3, 4, and 5, and to the lower end of the valve 2 is a gauge discharge pipe 15 which empties the contents of the gauge overboard.

Attached to the stem of valve 1, which is integral with the valve plug, is a short lever 12, to which is linked a connecting rod 10 by means of clevis 20 and pin 17. Fastened to the lower end of rod 10 by means of turnbuckle 7 and locknuts 8 and 9 is connecting rod 11, which is in turn linked to operating lever 14 by means of clevis 19 and pin 16.

The forged end 13 of lever 14 is connected to the valve stem of valve 2, the entire operating mechanism described above being so designed as to either open or close both valves simultaneously when handle 21 is moved in a vertical direction.

Covering an opening in pipe 3 is a glass window 5, held in place by a frame 4 which is attached to tube 3 by a number of machine screws; on each side of the window 5 is a rubber gasket to prevent water leakage and glass breakage. Under frame 4, and held in place by it is a gauge strip 6, made of thin sheet metal and calibrated in percent. This arrangement permits the direct observation of the levels of the solids contained in the gauge tube and affords a simple method of determining the percentage of said solids in relation to the liquid vehicle in which they were carried, before being deposited in the gauge tube.

Referring now to Figures 3, 4, and 5, it will be seen that there are a number of methods of connecting the gauge to the discharge line of the dredge, of which these three drawings are representative. These methods of connection are not to be construed as the only ones which may be used or which are practical but are presented only as illustrations of the principle.

In Figure 3, 22 is a Y branch in the discharge line, having its end 23 attached to another section of pipe which is connected to the discharge opening of the pump.

The end 25 of the Y branch has affixed to it a blind flange 26 to which is attached, by welding or other suitable means, the "take-off" pipe 18 of the percentage-of-solids gauge.

The end 27 of the Y branch is connected to the pipe line 24 through which the dredged material is discharged.

In this method of connection the flow of material from the pump discharge to the take-off tube of the gauge is in a straight line; hence this method is probably to be preferred to other means as there is less likelihood of separation of the solid material from the liquid. In operation, the mixture of solids and liquid, which is very highly agitated, after emerging from the pump enters the Y branch at the end 23 and follows the general directions indicated by the two broken lines and arrowheads. The greater portion of the discharge material flows through the end 27 of the Y branch, but a small portion is diverted through the take-off pipe 18 to the gauge. Due to the extreme agitation of the discharge material the sample obtained in this manner is truly representative of the main body of the discharge material. This is an important advantage over the conventional method of obtaining a sample in which a pipe, having a curved end, projects into the discharge line, where it easily becomes bent, or clogged with large particles, and which furthermore does not give a true sample because of its remote location from the dredge pump, which permits partial settling of the solids from the vehicle.

Referring to Figure 4, an alternate method of obtaining a sample is shown. The discharge line 24 which immediately follows the Y branch 22 has attached to its lower surface, by welding or other means, the gauge take-off pipe 18, to permit the extraction of a sample of highly agitated discharge. It will be noted that here again there is no abrupt change of direction of flow where the discharge enters the take-off pipe.

In Figure 5, the gauge take-off tube 18 is attached to the upper stern discharge elbow 28, near the point where the floating pipe line is coupled to the stern of the dredge. The angle of the take-off is such that the direction of flow in the tube 18 is approximately tangential to the direction of flow in the discharge elbow 28.

The primary considerations in each of the three suggested methods of obtaining a sample are those of not suddenly changing the direction of flow, and of taking the sample from a portion of the discharge line in which the degree of agitation is high.

Referring again to Figures 1 and 2 it will be seen that when the valves 1 and 2 are closed solids will accumulate above these valves in the tubes 18 and 3 respectively.

If, upon prolonged standing, the solids should become packed so tightly that the pressure of the discharge mixture from the pump is insufficient to dislodge them, the following means may be provided to clear the tubes. At the points 29 and 30 on the valves, holes are drilled at the angle indicated by the arrows. Each of these holes is tapped to accommodate a short length of pipe to which is attached a valve which is in turn coupled by a pipe line to a source of water, under a pressure greater than that of the discharge line. A suitable source of supply might be the dredge jet pump.

In operation, clearing the gauge of accumulated solids would be accomplished by first opening valves 1 and 2 by means of the operating lever 16, and then opening the valve attached to the flushing jet or hole at point 29, thus washing away the solids above valve 2. Then the flushing valve at point 30 would be opened, to wash away the solids above valve 1.

Before closing valves 1 and 2, both of the flushing valves would, of course, be closed.

It will now be seen that this gauge possesses the following characteristics:

It permits a rapid and accurate determination of the percentage of solids present in the discharge to be obtained without interrupting dredging operations and thus avoiding loss of time. The provision of the scale graduated directly in percentage enables the operator to quickly make a number of trials and find an average figure by a simple mental calculation.

Because of its unique means of taking a sample from the discharge line, this gauge assures an accurate indication which is independent of the skill or ability of the operator.

The elimination of the conventional, and easily damaged, take-off tube projecting into the discharge line effects a very considerable saving in maintenance cost and in expense of dredging due to avoidance of the necessity of suspending operation of the dredge to remove and replace the conventional take-off pipe.

The provision of a transparent window in the gauge makes it possible to determine not only the total percentage of solids present, but also to classify the solids as to type, such as sand, mud, and gravel, and to express the percentage of each.

It enables the operator of the dredge to keep himself constantly informed as to the effectiveness of the dredging operations and to govern his actions accordingly.

Of the several important advantages obtained through the use of this gauge, the following may be cited as outstanding examples of its utility.

Since it is always desirable to know the number of cubic yards of material dredged, this gauge is especially useful because it permits ready computation of the total yardage moved. Knowing the velocity of flow and the cross-sectional area of the discharge line, the total material handled per hour or other unit of time may be readily calculated. This, multiplied by the average percentage of solids, as indicated by the gauge, gives the actual quantity of solids dredged per unit of time, and affords a definite basis for payment for contract work.

Furthermore, since the cost of dredging is related to the yardage moved per hour, the percentage of solids present in the discharge of the dredge serves as an indication of the efficiency of operation and the ability of the operator.

A number of different constructions are possible in which the principles herein disclosed may be applied. I, therefore, do not wish to be restricted in the application of my new invention except by the terms of the following claims.

Having described my invention what I claim as new and wish to secure by Letters Patent is:

1. In a gauge for measuring the relative solid content of a mixture of one or more solids and liquids, an inlet and outlet means of equal cross-sectional area, each provided with a valve or its equivalent, said valves being provided with a means for opening or closing both valves simultaneously, a settling chamber provided with an opening having a transparent window through which the contents may be observed, and a scale adjacent to said window and calibrated directly in percent or other desired terms.

2. In a gauge for determining the percentage of solids in the discharge of pipe-line dredges, the combination with a dredge discharge pipe; of a vertically disposed settling-chamber having a sight opening calibrated in percentages of solids in the discharge mixture, valve-controlled inlet and outlet openings of equal cross-sectional area at opposite ends of the settling chamber, means interconnecting the control valves to effect their simultaneous actuation, and a coupling between the valve controlled inlet of the settling chamber and the dredge discharge pipe, said coupling being such as to divert, a portion of the mixture flowing through the discharge pipe, into the settling chamber, without abruptly altering the direction of its flow.

3. In a gauge for determining the percentage of solids in the discharge of pipe-line dredges and the like, the combination with a dredge discharge pipe; of a vertically disposed tubular settling-chamber having adjacent its lower end a sight opening calibrated in percentages of solids in the discharge mixture, valve-controlled inlet and outlet openings of equal cross-sectional area at opposite ends of the settling-chamber, means interconnecting the control-valves to effect their simultaneous actuation, a take-off connection between the valve controlled inlet of the settling-chamber and the dredge discharge pipe, the formation of said connection being such as to divert, a portion of the mixture flowing through the discharge pipe, into the settling-chamber, without abruptly altering the direction of its flow.

LOUIS R. CONRATH.